(12) United States Patent
Eichinger

(10) Patent No.: US 8,998,732 B2
(45) Date of Patent: Apr. 7, 2015

(54) DEVICE FOR DAMPING VIBRATIONS IN A DRIVE TRAIN

(75) Inventor: Roman Eichinger, Vienna (AT)

(73) Assignee: Andritz AG (AT)

( * ) Notice: Subject to any disclaimer, the term of this patent is extended or adjusted under 35 U.S.C. 154(b) by 0 days.

(21) Appl. No.: 13/812,705

(22) PCT Filed: Jul. 21, 2011

(86) PCT No.: PCT/AT2011/000310
§ 371 (c)(1),
(2), (4) Date: Jan. 28, 2013

(87) PCT Pub. No.: WO2012/012816
PCT Pub. Date: Feb. 2, 2012

(65) Prior Publication Data
US 2013/0123029 A1    May 16, 2013

(30) Foreign Application Priority Data
Jul. 29, 2010   (AT) .................................. 1271/2010

(51) Int. Cl.
*F16C 3/02*     (2006.01)
*F16D 3/14*     (2006.01)
*F16D 7/02*     (2006.01)
*F16F 7/02*     (2006.01)
*F16F 7/08*     (2006.01)
*F16F 15/12*    (2006.01)

(52) U.S. Cl.
CPC ................. *F16D 3/14* (2013.01); *Y10T 464/50* (2013.01); *F16C 3/02* (2013.01); *F16D 7/021* (2013.01); *F16F 7/02* (2013.01); *F16F 7/08* (2013.01); *F16F 15/12* (2013.01)

(58) Field of Classification Search
USPC ............ 464/30, 68.4, 68.41, 97, 180, 41, 45; 188/254; 180/380
See application file for complete search history.

(56) References Cited

U.S. PATENT DOCUMENTS

| 496,710 | A | * | 5/1893 | Thomson ........................ 464/45 |
| 1,716,284 | A | | 6/1929 | Risley |
| 1,876,658 | A | * | 9/1932 | Fox ................................ 464/30 |
| 1,913,886 | A | * | 6/1933 | Kennedy ..................... 464/97 X |
| 2,346,432 | A | * | 4/1944 | Heintz ............................ 464/97 |
| 2,705,113 | A | * | 3/1955 | Bonanno .................... 464/41 X |
| 2,907,190 | A | * | 10/1959 | Pastor ............................ 464/30 |

(Continued)

FOREIGN PATENT DOCUMENTS

| EP | 0567351 | 10/1993 |
| FR | 2624225 | 6/1989 |
| GB | 1546342 | 5/1979 |

OTHER PUBLICATIONS

International Search Report for PCT/AT2011/000310, English translation attached to original, Both completed by the European Patent Office on Nov. 30, 2011, All together 7 Pages.

*Primary Examiner* — Gregory Binda
(74) *Attorney, Agent, or Firm* — Brooks Kushman P.C.

(57) ABSTRACT

A device for damping vibrations in a drive train, in particular for plug screws in the pulp and paper industries. The device is principally characterized in that a cylindrical shaft, preferably designed as a hollow shaft, is provided, wherein the cylindrical shaft is arranged between the halves of a coupling and at least one ring having friction surfaces is arranged around the cylindrical shaft. Stick-slip vibrations that occur can thereby be favorably eliminated, and thus the gearbox and the motor of the drive train can be protected.

4 Claims, 3 Drawing Sheets

(56) References Cited

U.S. PATENT DOCUMENTS

| | | | |
|---|---|---|---|
| 3,320,772 A | * | 5/1967 | Saxton ................... 464/30 X |
| 3,556,273 A | * | 1/1971 | Maucher ................ 464/68.4 X |
| 3,834,183 A | * | 9/1974 | Muller |
| 7,121,948 B2 | * | 10/2006 | Huthmacher et al. .......... 464/41 |
| 2006/0228246 A1 | * | 10/2006 | West et al. |
| 2007/0240959 A1 | | 10/2007 | Knowles |

* cited by examiner

DEVICE FOR DAMPING VIBRATIONS IN A DRIVE TRAIN

CROSS-REFERENCE TO RELATED APPLICATION

This application is the U.S. national phase of PCT Appln. No. PCT/AT2011/000310 filed on Jul. 21, 2011, which claims priority to Austrian Patent Application No. A 1271/2010 filed on Jul. 29, 2010 the disclosures of which are incorporated in their entirety by reference herein.

TECHNICAL FIELD

The invention relates to a device for damping vibrations in a drive train.

BACKGROUND

For the damping of vibrations in drive trains, there are numerous different types of vibration dampers. Viscous (for example speed-proportional, hydraulic) dampers pump liquids from one chamber into another chamber via a flow resistance. To permit this, the handling of the oil which is used, together with sealing problems, must be taken into consideration. An alternative to hydraulic dampers are friction dampers. The advantage of a (Coulomb) friction damper is the construction from materials with linear material characteristics which do not change over the service life. In this way, the dynamic behavior of the damper can be predicted very accurately by means of suitable simulation programs. The installed parts can be machined in a cutting process in the conventional way.

It is an aim of the invention to eliminate the risk of vibrations in drive trains.

SUMMARY

The invention is therefore characterized in that a cylindrical shaft, formed preferably as a hollow shaft, is provided, around which cylindrical shaft is arranged at least one ring with friction surfaces. Also considered to be a ring in this context are annularly arranged friction elements, wherein here, the friction elements extend over a major part of the circumference of the circle. The ring with the friction surfaces acts here as a damper element, whereas the shaft, preferably hollow shaft, acts as a spring element for providing the restoring action into the initial position.

One advantageous refinement of the invention is characterized in that the friction surfaces are arranged radially at the outside on at least one ring. An expedient embodiment of the invention is characterized in that a hollow cylinder is arranged around the at least one ring, wherein the hollow cylinder may be divided. If a hollow cylinder is arranged around the at least one ring, it is possible in an expedient manner for the counterpart surface to the friction surface to be provided on the inner circumference of the hollow cylinder, wherein the hollow cylinder also protects the (hollow) shaft against fouling.

One expedient refinement of the invention is characterized in that the hollow cylinder or a component cylinder thereof has slots which extend axially and which are arranged around the cylinder circumference, wherein a tangentially preloaded clamping band or a plurality of preloaded tie rods arranged tangentially around the circumference may be provided for imparting the damper torque. By means of the slots, the friction torque can be set in an effective manner, wherein the damper torque can be imparted in a simple manner by means of a clamping band. A plurality of tangentially arranged tie rods has the advantage that the required force can be divided in an effective manner between the individual elements.

An alternative embodiment of the invention is characterized in that a plurality of rings are provided which have friction surfaces on the axial end sides, wherein the rings may form the hollow cylinder. By means of said arrangement, it is possible for the energy generated during the damping process to be distributed in a particularly effective manner. The elements can also be assembled in a particularly simple manner and/or also replace individual elements in a simple manner.

One expedient refinement of the invention is characterized in that a plurality of axially preloaded tie rods are provided for imparting the damper torque. The force to be imparted can be distributed in an effective manner as a result of the arrangement of the tie rods.

BRIEF DESCRIPTION OF THE DRAWINGS

The invention will now be described by way of an example on the basis of the drawings, in which.

DETAILED DESCRIPTION

Figure 1:
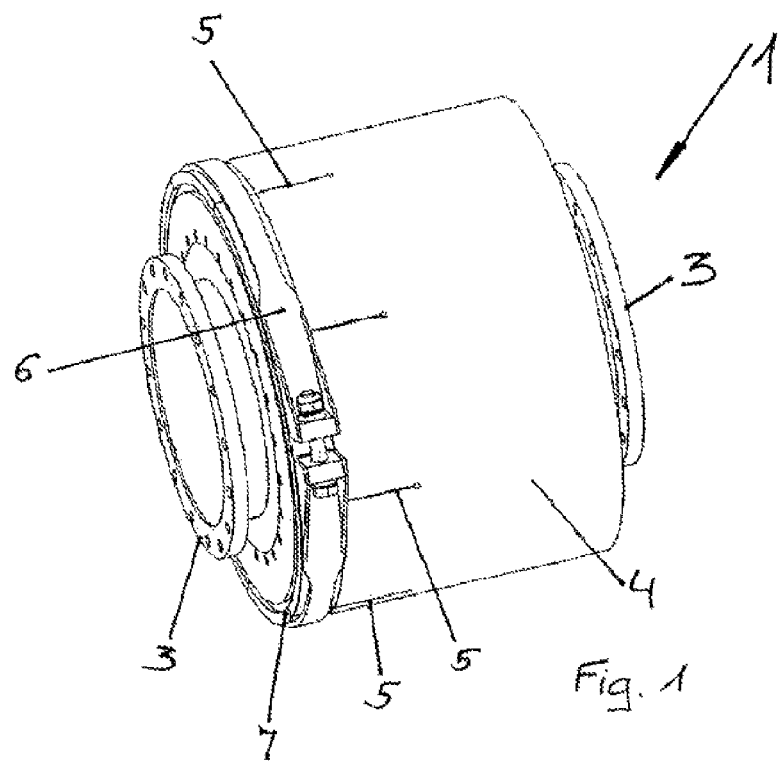
FIG. 1 shows an isometric view of one variant of the invention.

FIG. 1 shows an isometric view of a first variant of a rotary vibration damper 1 according to the invention. Said rotary vibration damper 1 is composed of a shaft 2 with flanges 3, which shaft transmits the entire torque from the gearbox (not illustrated) to the bearing shaft (not illustrated). Said shaft 2 with the flanges 3 serves as a torsion spring element of the rotary vibration damper 1. To one flange there is fastened a tube (hollow cylinder) 4 which extends beyond the other flange 3. The tube 4 has slots 5 which extend axially and which are arranged around the cylinder circumference. The setting of the friction torque is realized by means of a clamping band 6 which is held together and tangentially preloaded by means of a screw 7.

Figure 2:
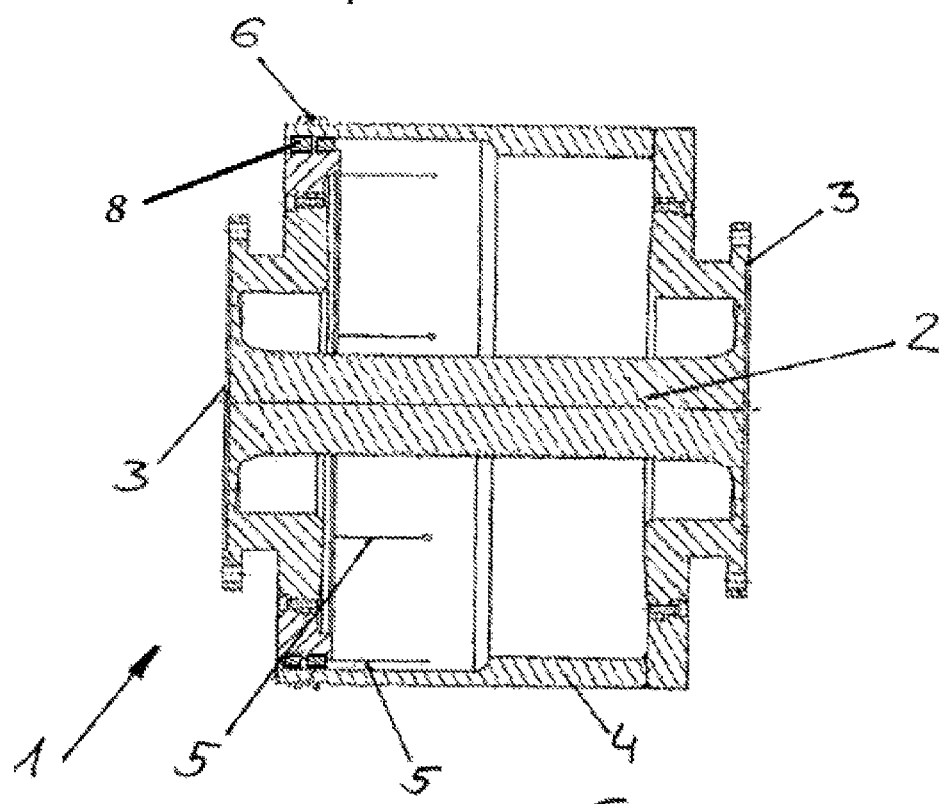
FIG. 2 shows a section through the first variant of the invention.

FIG. 2 shows the rotary vibration damper 1 according to the invention in section. Here, the shaft 2 has been illustrated as a solid shaft, though it may also advantageously be formed as a hollow shaft, wherein weight can be saved in this way. It is also possible to clearly see the form of the flanges 3 which are fixedly connected to the shaft 2. The flanges 3 are fixedly connected in each case to one half of a clutch. A tube (hollow cylinder) 4 is fastened to one of the flanges 3, and rings 8 with friction surfaces are fastened in the circumferential direction (tangentially) to the other, wherein two rings 8 arranged adjacent to one another are illustrated here. The rings 8 may also be composed of a number of annularly arranged slide strips which serve as friction elements. Depending on loading, it is however also possible for only one ring 8 or a plurality of rings 8 to be used. Here, the tube 4 surrounds the rings 8. If a torsional moment acts on the flange 3, the torsion spring (shaft 2) is expanded. If the expansion is so great that the adhesion limit between the tube 4 and the rings 8 is exceeded, energy is dissipated by the friction.

Figure 3:
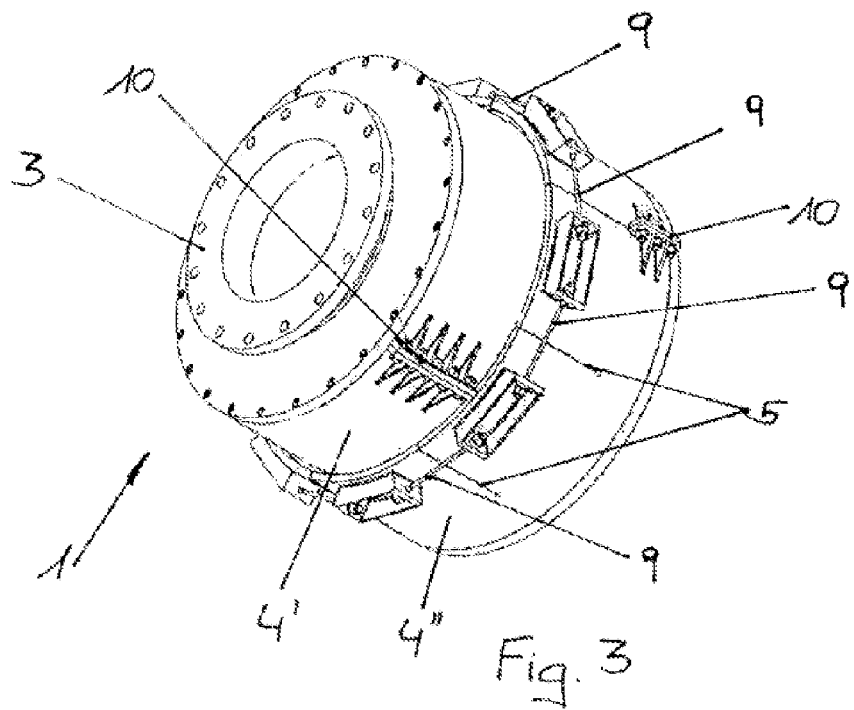
FIG. 3 shows an isometric view of a second variant of the invention.
Figure 4:
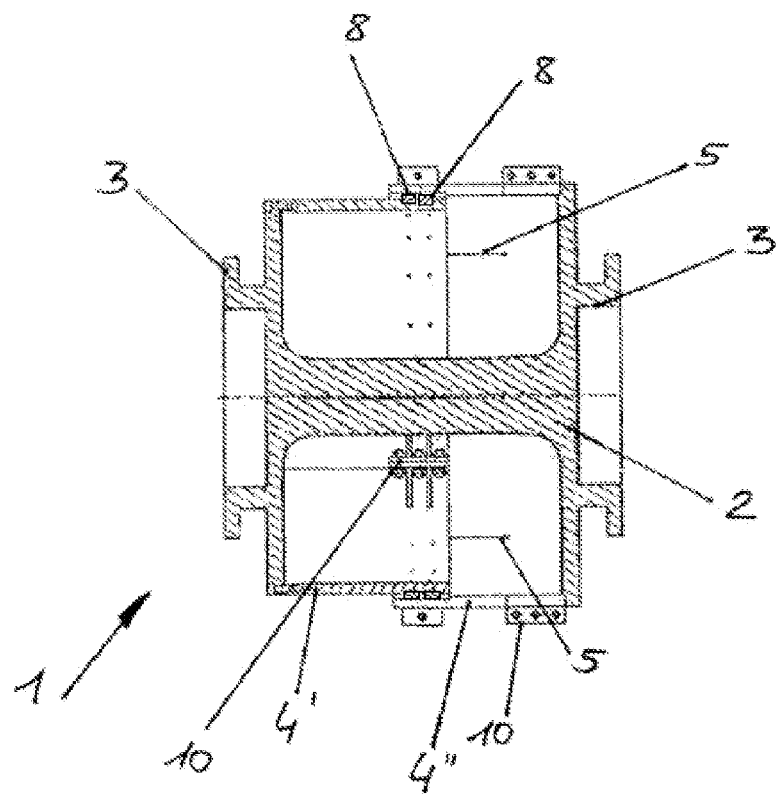
FIG. 4 shows a section through a second variant of the invention.

FIG. 3 and FIG. 4 show a second variant of a rotary vibration damper according to the invention, wherein FIG. 1 shows an isometric view and FIG. 2 shows a section. Here, too, flanges 3 are fixedly connected to a shaft 2 which may be formed as a hollow shaft. Here, the tube 4 is formed in two parts and is composed of an inner tube 4' and an outer tube 4" which are plugged one into the other and have an interference fit. Here, the outer tube 4" has slots 5. Here, to be able to set the friction torque, tangential tie rods 9 are arranged around the circumference.

The function of the rotary vibration damper 1 can be gathered from FIG. 4. The inner tube 4' has a smaller diameter and is provided at its end with rings 8, wherein two rings 8 are illustrated here, but it is also possible for only one ring 8 or a plurality of rings 8 to be used. For more expedient production, it is the case here that the tubes 4' and 4" are produced as half-shells and are fixedly connected to one another by means of screws 10.

Figure 5:
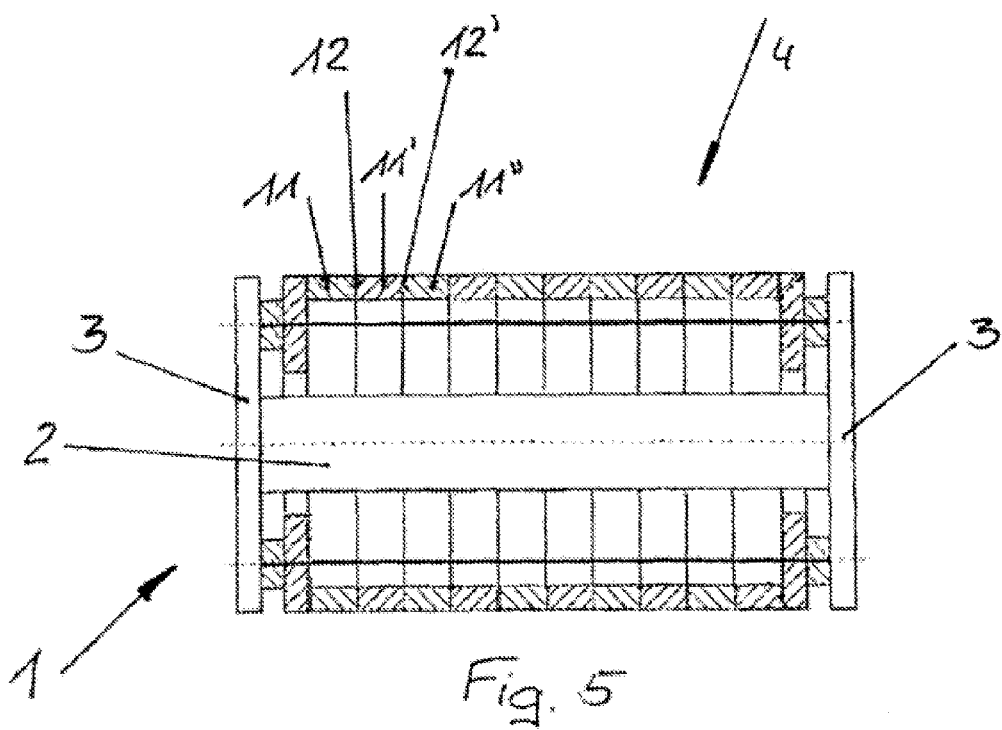
FIG. 5 shows a section through a further variant of the invention.

FIG. 5 shows a further variant of the invention. The rotary vibration damper 1 is likewise composed of a shaft 2 which may be formed as a hollow shaft and which is provided, on its ends, with flanges 3. Here, the shaft 2 acts again as a torsion spring. The tube 4 is formed here by rings 11, 11', 11" etc., between which are provided friction surfaces 12, 12' etc. The construction with rings 11 provides redundancy. If one friction pair seizes, then there are others which perform the function of the damper.

The rotary vibration damper according to the invention can be used wherever sufficient space exists or is required in terms of axial length in a drive train.

The invention claimed is:

1. A device for damping vibrations in a drive train, comprising:
   a cylindrical shaft having opposing ends, each end having a circumferential flange for mounting the device, the circumferential flanges defining a torsion spring element of the device;
   at least one ring arranged around the cylindrical shaft and having friction surfaces on the outside of each of the at least one ring; and
   a hollow cylinder arranged around the at least one ring and rotatably engaging the friction surfaces of the at least one ring, the hollow cylinder having slots which extend axially and are arranged around a circumference of the hollow cylinder.

2. The device as claimed in claim 1, wherein the hollow cylinder is divided into at least two separate parts.

3. The device as claimed in claim 1, wherein a tangentially preloaded clamping band is provided around the hollow cylinder for imparting damper torque.

4. The device as claimed in claim 1, wherein a plurality of preloaded tie rods arranged tangentially around the circumference are provided for imparting damper torque.

* * * * *